United States Patent [19]

Paluch

[11] 4,037,910

[45] July 26, 1977

[54] TELEPHONE DISTRIBUTION FRAME CONNECTOR ASSEMBLY

[75] Inventor: Edward S. Paluch, Elmwood Park, Ill.

[73] Assignee: Reliable Electric Company, Franklin Park, Ill.

[21] Appl. No.: 722,426

[22] Filed: Sept. 13, 1976

[51] Int. Cl.² .............................................. H01R 9/00
[52] U.S. Cl. .................................. 339/198 R; 179/98; 339/18 R; 361/428
[58] Field of Search ..................... 179/98; 317/99, 122; 339/18, 198 R, 198 S, 198 N

[56] References Cited

U.S. PATENT DOCUMENTS

| | | | |
|---|---|---|---|
| 3,255,330 | 6/1966 | MacKenzie | 317/99 |
| 3,518,611 | 6/1970 | Shores | 339/18 R |
| 3,535,463 | 10/1970 | Trucco | 179/98 |
| 3,760,328 | 9/1973 | Georgopulos | 339/18 R |
| 3,947,732 | 3/1976 | Cwirzen | 317/122 |

FOREIGN PATENT DOCUMENTS 2,249,514  5/1975  France .................................... 179/98

Primary Examiner—Roy Lake
Assistant Examiner—Mark S. Bicks
Attorney, Agent, or Firm—Olson, Trexler, Wolters, Bushnell & Fosse, Ltd.

[57] ABSTRACT

A telephone distribution frame connector assembly comprises a connector block with terminals for receiving plug-in type overload protector modules. Incoming line pairs are connected through a cable stub to terminals on the block. Furthermore, terminals on the block are connected to inside central office equipment, the connections being through the overload protector modules. A test field is provided for testing the lines. The test field and the terminals for central office connection are mounted in various novel ways to effect a compact arrangement.

6 Claims, 7 Drawing Figures

TELEPHONE DISTRIBUTION FRAME CONNECTOR ASSEMBLY

BACKGROUND OF THE INVENTION

This invention relates to telephone circuit distribution systems, and more particularly to a telephone distribution frame connector assembly having overload protector modules and a test field.

Distribution frame connectors of the type having plug-in modules are generally known in the telephone art. Such arrangements are typically shown in patents to Shores, Jr. U.S. Pat. No. 3,518,611 and Georgopulos U.S. Pat. No. 3,760,328. In such arrangements outside lines are connected on connector blocks to central office equipment through protector modules which protect the inside equipment from overvoltage or overcurrent faults. These connector blocks are mounted on distribution frames, for instance those having uprights. The connector block also includes some type of test field wherein a test shoe can be used to test a number of lines simultaneously. In arrangements of the foregoing type it is desirable to package the various components in a minimum of space and yet provide for ready servicing in terms of making line tests and replacing plug-in protector modules.

OBJECTS AND SUMMARY OF THE INVENTION

An object of this invention is to provide a telephone distribution frame connector assembly which is economical in terms of its "packaging" of the components, but which is nevertheless accessible for servicing when mounted on a distribution frame. Of primary importance, is the fact that this packaging approach increases by approximately 50 to 67 percent on an 8 foot vertical, even more on taller verticals, the number of protected pairs that can be mounted in the same vertical space used by the present generation of telephone distribution frame connectors.

A further object of this invention is to provide a connector of the type stated in which the test field is uniquely positioned for ready access by service personnel.

In accordance with the foregoing objects the connector assembly comprises an insulating connector block having a front face, a rear face and opposed side faces. Means are provided for mounting the block on a distribution frame such that the rear face is adjacent to the frame and the front face is remote from the frame. A plurality of such blocks are mounted on a distribution frame, preferably about eight inches on center, and with the blocks being side by side and parallel with a side face of one block being presented to a side face of an adjacent block. The block has a group of socket type electrical terminals for receiving a plurality of plug-in overload protector modules. Terminals are provided for connection of wires to inside central office equipment. There is a cable stub adjacent to the rear face of the block. The cable stub has pairs of wires (typically 100 pair) in electrical connection with the socket type terminals so that subscriber circuits are completed from the cable stub to the central office equipment through the overload protector modules. In one form of the invention the test field is at the front face of the connector assembly so that it is accessible to service personnel. The test field may be divided up into two sections offset from one another and in various configurations, as will be hereinafter more fully described. In another form of the invention the test field comprises elongated plug-in receptacles at one side of the block but near the forward face thereof.

DETAILED DESCRIPTION

Figure 1:
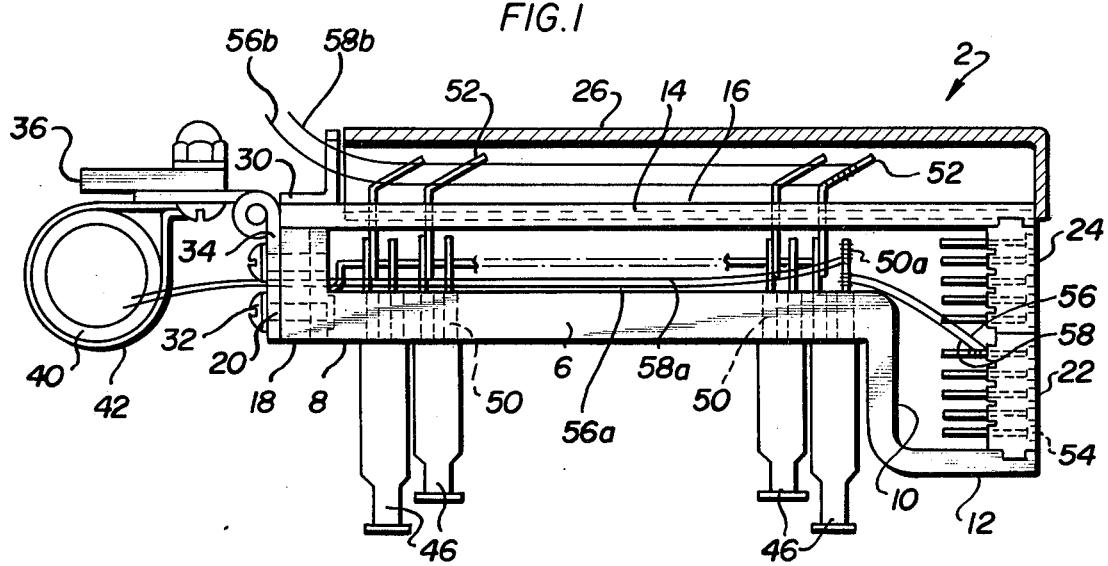
FIG. 1 is a sectional view looking downwardly of the frame assembly in accordance with the present invention.
Figure 2:
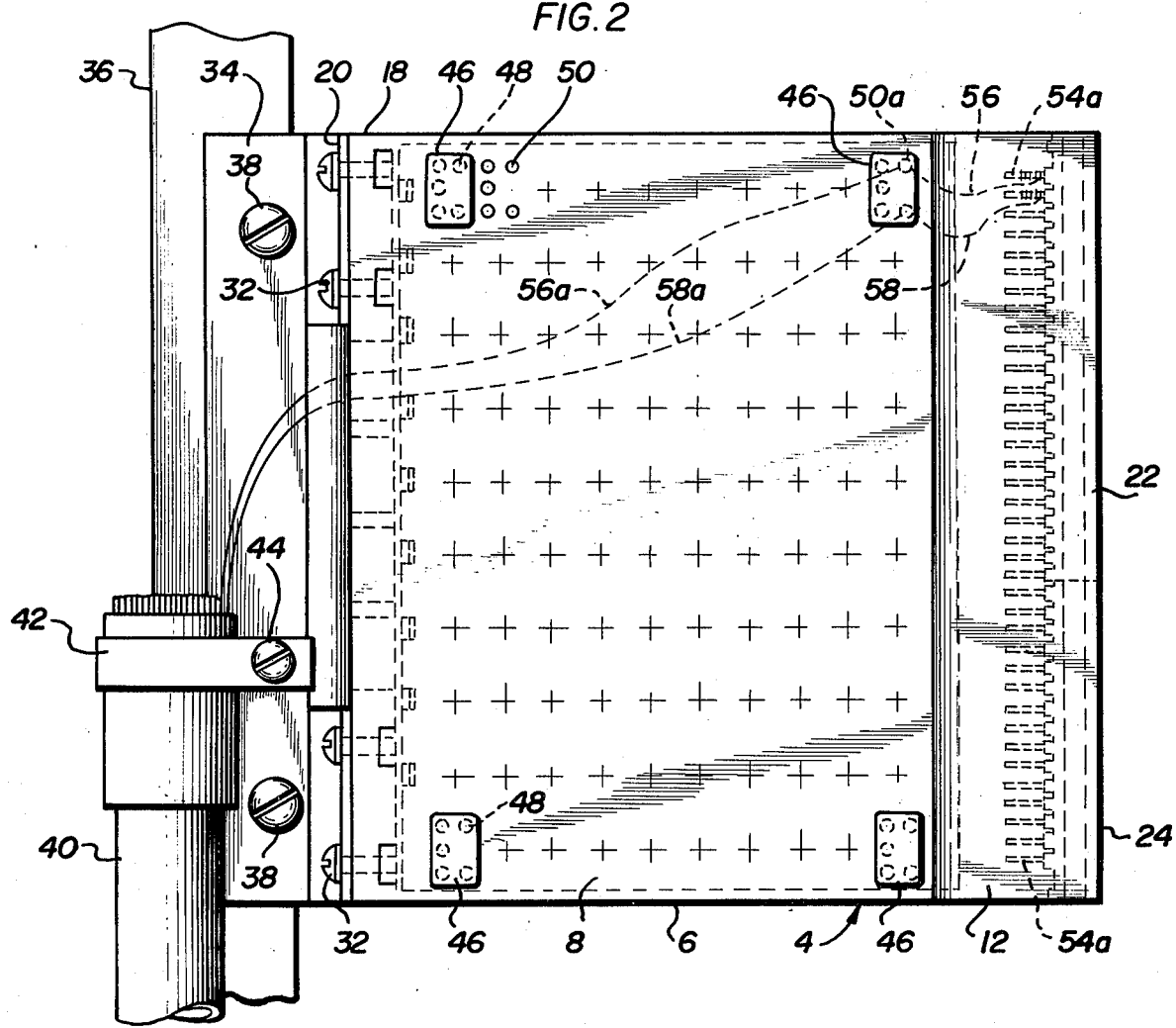
FIG. 2 is a side elevational view of the structure of FIG. 1.
Figure 3:
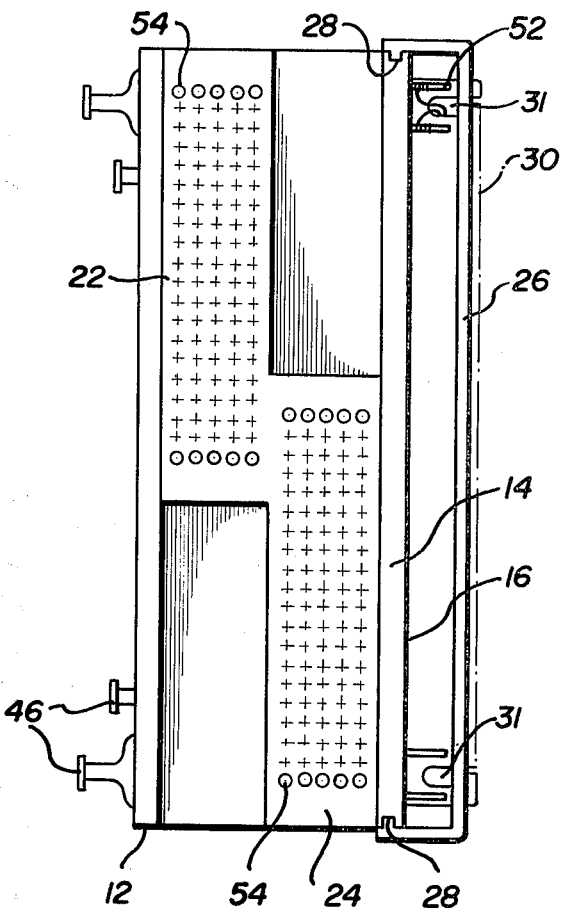
FIG. 3 is a front elevational view of the assembly.

Referring now in more detail to the drawing, and in particular to FIGS. 1 - 3, there is shown a telephone distribution frame connector assembly 2 that includes a connector block structure 4 of insulating material. The block 4 has a panel 6 with an outer surface 8 that provides a side face for the block 4. At one end the panel 6 has a lateral flange 10 and a forward flange portion 12 to provide a somewhat widened front for the block 4.

The block 4 also comprises a plate 14 spaced from the panel 6. The plate 14 has an outer surface 16 that constitutes another side face of the panel 4 that is opposite to the side face 8. At the rear of the block 4 is a portion 18 that is integral with and transverse to the panel 6 and joined to the plate 14. This portion 18 provides a rear structure for the panel 6, this rear structure having a rear face 20.

Figure 6:
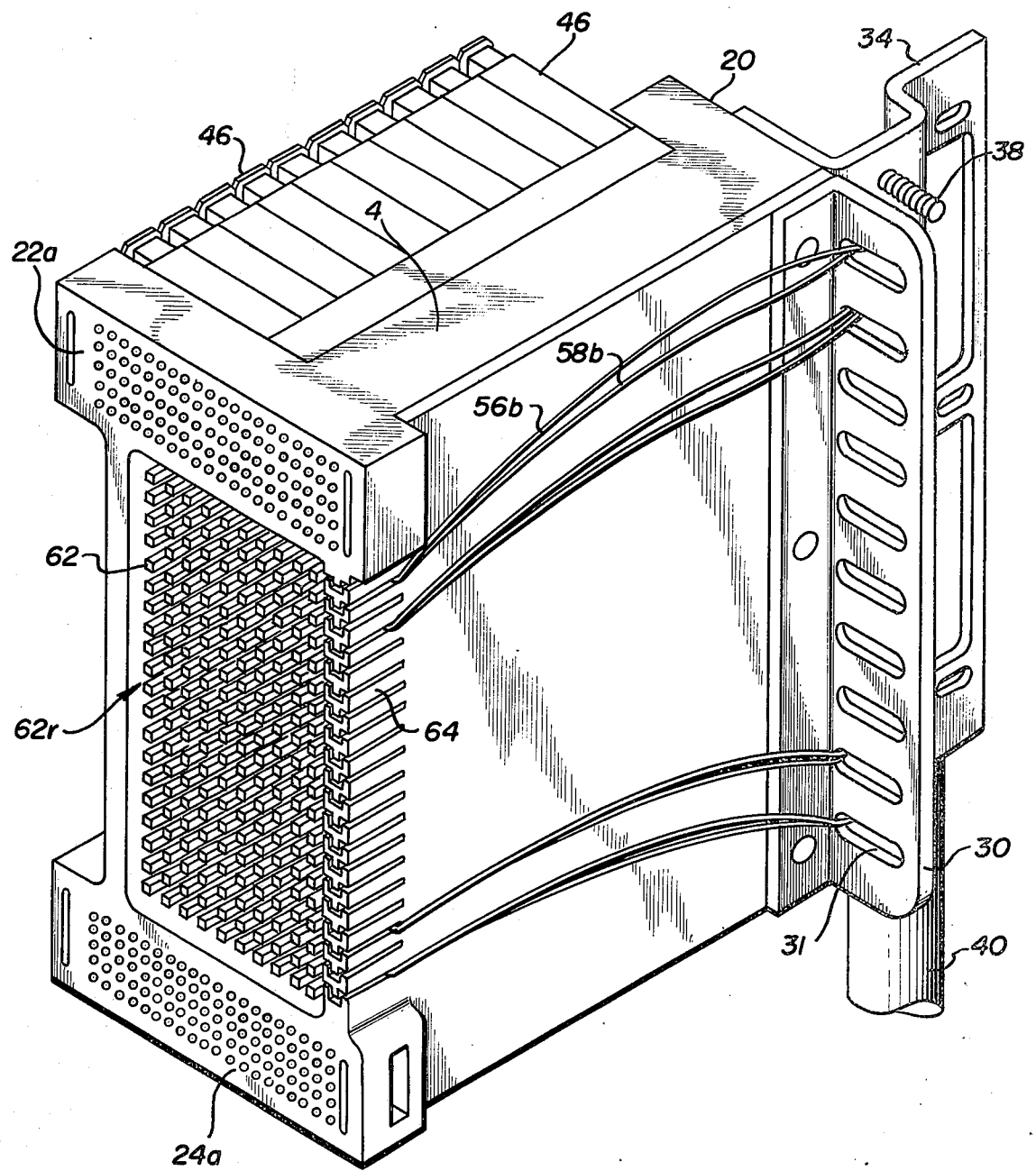
FIG. 6 is a perspective view of another form of the invention.
Figure 7:
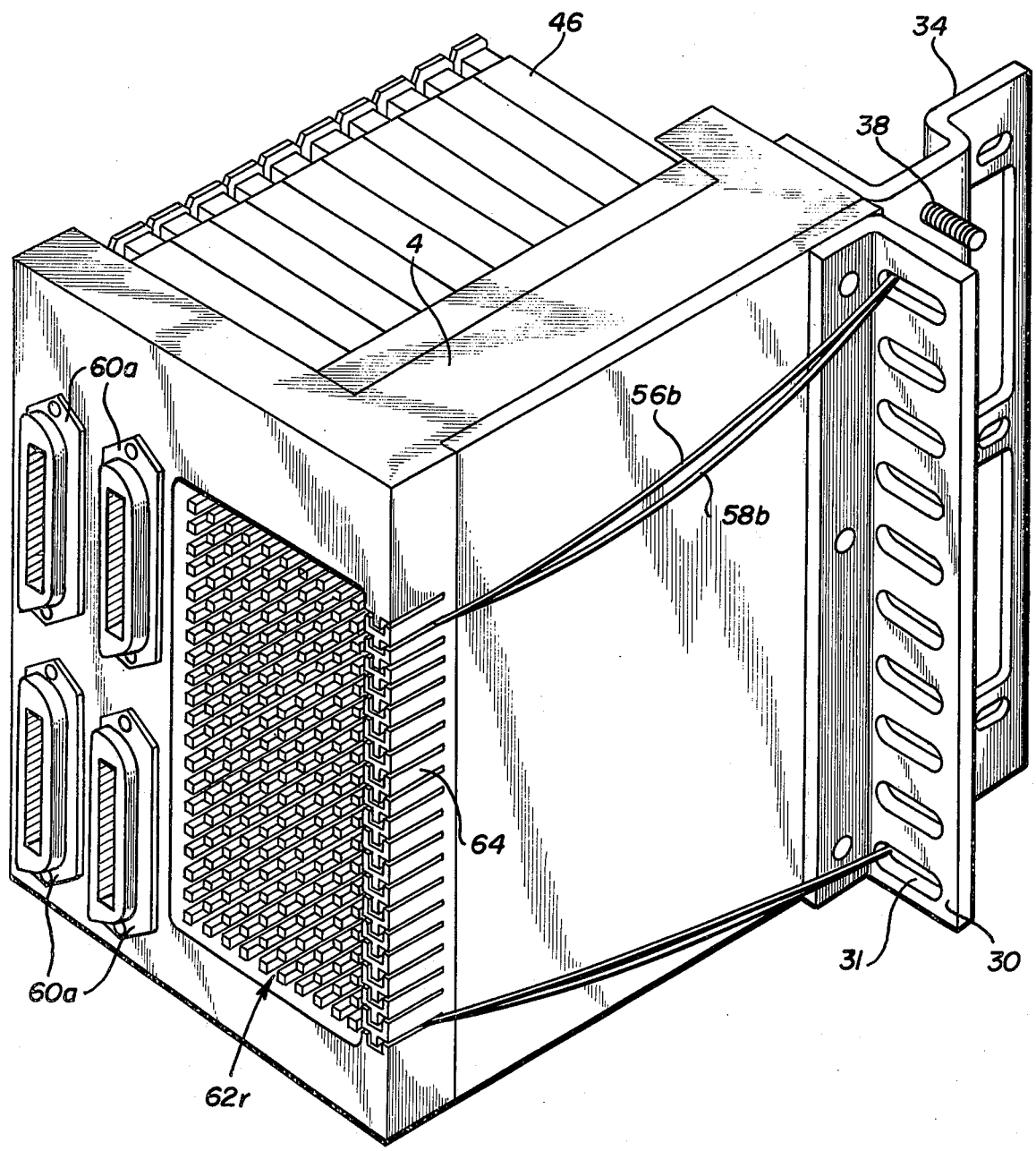
FIG. 7 is a perspective view of still another form of the present invention.

At the front face of the block 4 are two test field panel segments 22,24 which are of plastic and are side-by-side. They are integrally bonded or otherwise joined to the back of plate 14 and to the flange section 12. As will be seen best in FIG. 3 the test field panel segments 22,24 are vertically offset from one another, but having some overlap at the central region of the front face of the block 4. There is also provided a transparent cover 26 that overlies the side plate 14. This cover 26 is removable and may have a sliding fit at tracks 28,28 (FIG. 3). Adjacent to the cover 26 and at the rear of the side plate 16 is a fanning strip 30 which runs substantially the full vertical length of the block 4. The fanning strip 30 has a series of slots 31, as best shown in FIGS. 6 and 7, for sorting wires going to central office equipment.

Mounted on the rear face 20 by screws 32 is a bracket 34 by which block 4 may be secured to an upstanding frame member 36 that is a vertical structural member of a telephone distribution frame. A number of such members 36 support a series of assemblies 2, each member having a plurality of assemblies 2 one above the other. Thus, a side face of one block will be presented to a side face of an adjacent block on the adjacent upright member 36. The bracket 34 may fit against the frame member 36 and be secured thereto by any suitable bolt and nut assemblies 38,38. Also secured to the bracket 34 is a cable stub 40. Clamps 42,42 encircle the cable stub 40 and the clamps 42,42 are attached to the bracket 34. The cable stub 40 typically has one hundred pairs of wires, each pair being made up of a "tip" wire and a "ring"

wire. The lower ends (not shown) of these hundred pairs are spliced to outside subscriber lines which are external to the situs of the distribution frame.

The assembly 2 is intended to be an interface between the outside lines and the central office or in-plant equipment. The interfacing is carried out through line overload protector modules 46 which may be of any known type, for instance that shown in U.S. Pat. No. 3,587,021 to Baumbach.

These modules provide overvoltage protection in the event of lightning or power line faults. Usually also the modules provide overcurrent protection. The modules are typically of the plug-in type having a number of conductive pin terminals 48 that are adapted to be plugged into socket type electrical terminals 50 conventionally mounted in the panel 6. In the form of the invention herein illustrated, each protector has a five-pin arrangement which provides for an input and an output for each of the tip and ring lines, plus a ground pin. The ground pins are conventionally grounded. The pin terminal pattern in the modules 46 is shown in the present application by way of illustration only, and not by way of limitation. In the present invention there are one hundred modules in a ten by ten array, designated by the crosses shown in FIG. 2 on the face 8, four modules 46 at the corners of the array being actually shown.

Some of the socket terminals 50 have extensions running rearwardly and through the plate 16 to provide bent pin portions 52. The bent pin portions 52 form an array of wire wrap terminals at which wires may be connected to central office equipment. Thus, the bent pin portions 52 are extensions of those socket terminals 50 that receive the socalled central office pins 48 of the protectors 46.

The test strip segments 22,24 also have terminals 54 which have rearwardly extending wire wrap sections 54a. As best seen in FIGS. 1 and 2, test field wires 56,58 are wire wrapped to the rearward wire wrap portions 50a of those socket terminals 50 that do not provide the bent pin portions 52. Likewise, a pair of wires 56a, (tip) 58a, (ring) running from the cable stub 40, are wire wrapped to the pin portions 50a, 50a so as to electrically connect those pin portions 50a, 50a, the wires 56,56a and the wires 58,58a. The wiring of the wires 56,56a,58,58a onto the wire wrap portions 50a,54a constitute internal wiring that is made as part of the procedure for constructing the assembly 2. Only one pair of wires 56,58 is shown, it being understood that the other ninety-nine pairs of wires are wrapped in like manner.

Wrapped around the bent pin wire wrap pin portions 52 are wires 56b,58b which pass through the fanning strip 30 to central office equipment of known type, for instance, switching equipment. This side of the interface is frequently called the "switchboard side". Thus, each line of a pair coming from the outside of the plant is in a circuit that runs through the module and to the central office equipment. At the same time there is a jumper wire that joins each line pair to the test field. The cover 26 may be removed for wire wrapping operations at bent pins 52.

The assemblies 2 are mounted with the modules 46 extending perpendicular out to one side and with the test field presented forwardly. This results in a saving of space and yet makes the test field convenient for operation because test field shoes do not have to be inserted between assemblies 2 on adjacent members 36. Each test field 22,24 may receive the shoe or adapter whereby fifty line pairs can be tested at one time. Also, by offsetting the test fields 22,24 the wires 56,58 tend to be spread out over a larger region and are, therefore, less crowded. This facilitates manufacture of the assembly 2.

Figure 4:
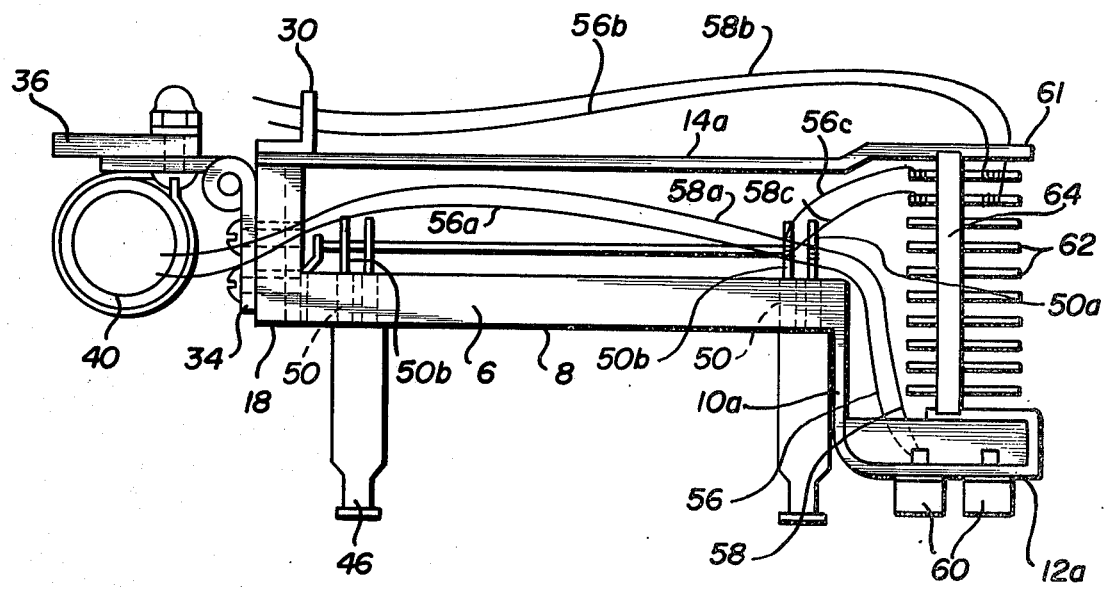
FIG. 4 is a sectional view smilar to FIG. 1 but of a modified form of the invention.
Figure 5:
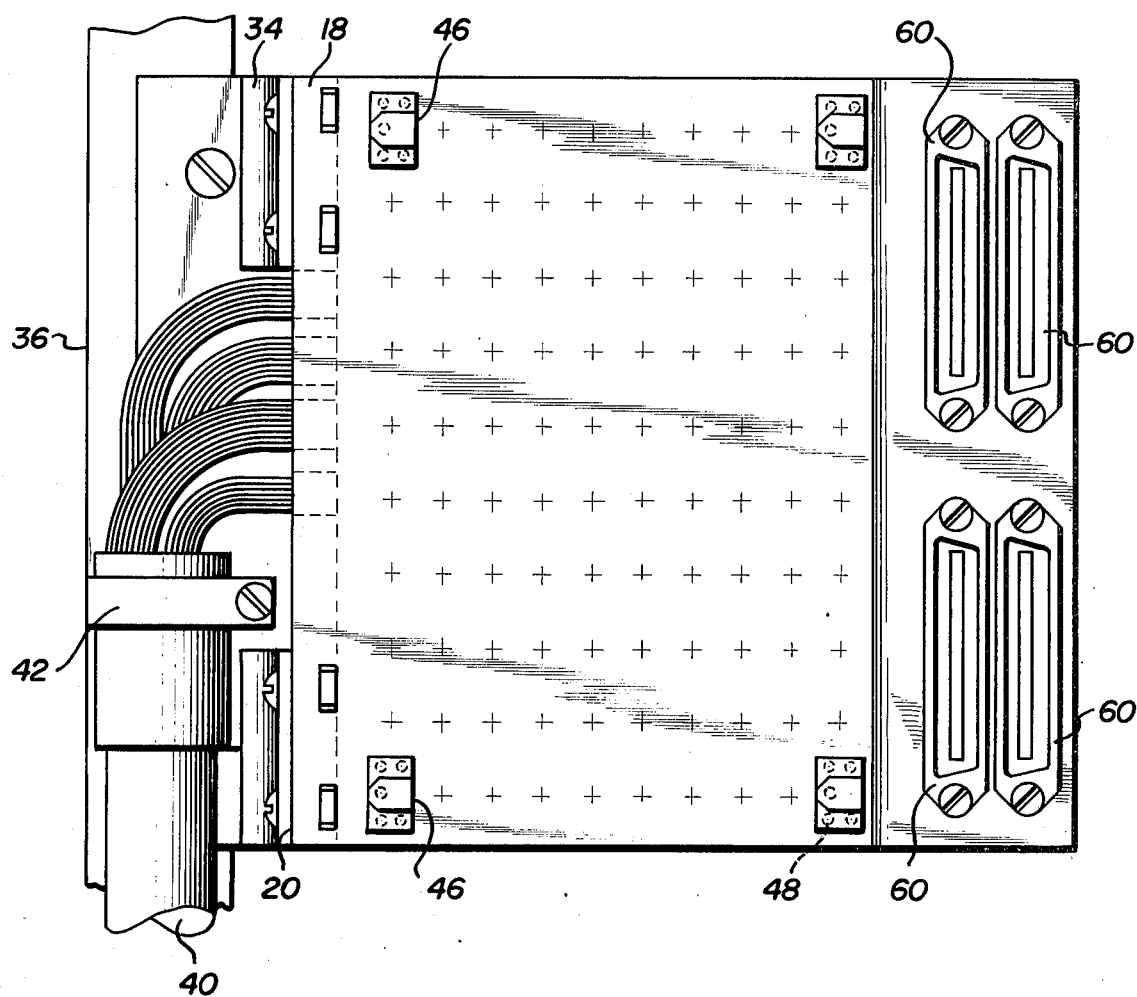
FIG. 5 is a side elevational view of the structure of FIG. 4.

FIGS. 4 and 5 show a modification of the invention in which like reference numerals indicate like or corresponding parts as compared to the form shown in FIGS. 1 – 3. In the forms shown in FIGS. 4 and 5, the panel 6 has flange portions 10a,12a forming the front portion of one side of the block. The portions 10a,12a are offset from the part of the panel 6 that receives the modules 46. This offset portion supports four elongated socket type test shoe receptacles 60,60,60,60. The configuration of the structures 60 is known and need not be described. Suffice it to say, however, that these receptacles 60 each are adapted for plug-in reception of a tester capable of testing fifty pairs at one time.

The plate 14a is somewhat thinner and of somewhat different configuration than plate 14. The bent pin terminals 52 are not used, but are replaced by socket terminals 50. The forward edge of plate 14a has a fanning strip 61 for sorting and holding wires 56b,58b. The circuit through the protector module 46 for each line is the same as previously described. There are, however, jumper wires 56c,58c which are wire wrapped around the rear portions of pin terminals 62 and wire wrapped to 50b,50b. The pin terminals 62 are secured to a front panel 64 at which the wires 56b,58b to the central office equipment are wrapped. Thus, in this form of the invention the test receptacles 60,60,60,60 are at one side while the array of central office pins 62 are forwardly presented, i.e. at the front face of the block.

In FIG. 6 a further modified form of the invention is shown in which the forward face of the block assembly 4 includes the central office equipment pin array 62r consisting of two hundred pins of the type shown generally as 62 in FIG. 4. At one side edge of the front face is a front fanning strip 64 at which the wire pairs 56b,58b pass for connection to the central office equipment. Each pair 56b,58b also pass through the rear fanning strip 30 which is like the fanning strip 30 shown in the previous figures. The protector modules 46 project to one side of the block while the forwardly presented test strips or panels are made up of sections 22a,24a (each for testing fifty pair) which are on opposite sides of the pin terminal array 62r. Each test strip 22a,24a contains terminals with rear wire wrap portions (like at 54 and 54a) and are for substantially the same purpose as previously described with respect to FIGS. 1 – 3. In this form of the invention there is convenience to construction and maintenance personnel in the fact that the test strips 22a,24a are both forwardly facing and the same is true for the pin terminals 62 for wire wrap connections to the central office equipment. The internal wiring is not shown in FIG. 6 as it involves the same circuit arrangement, previously described with respect to wires 56,58,56a,58a,56b,58b,56c,58c (FIG. 4).

FIG. 7 shows a further modified form of the invention which is in many respects similar to FIG. 6 (the cable stub 40 being omitted). The essential difference between FIG. 6 and FIG. 7 lies in the fact that in FIG. 7 the test field is in the form of four elongated receptacles 60a of the type shown in FIGS. 4 and 5. Also the receptacles 60a are on the same face (i.e. the forward face) as is the pin terminal array 62r.

In both FIGS. 6 and 7, like in FIGS. 1 – 3, the test field structure is accessible without interference from adjacent blocks or modules thereon or from frame members.

I claim:

1. A telephone distribution frame connector assembly comprising an insulating connector block having a front face, a rear face, and opposed side faces, means for mounting said block on a distribution frame such that said rear face is adjacent to said frame and said front face is remote from said frame, one of said side faces having groups of socket-type electrical terminals for receiving a plurality of plug-in overload protector modules, the opposite side face having terminals for wired connection to central office equipment, a cable stub adjacent to said rear face, means for securing said cable stub to said block, said cable stub having wires in electrical connection with said socket type terminals for completing subscriber circuits from the wires of the cable stub to said opposite face terminals, a test field at said front face and accessible without interference from members of said frame or adjacent blocks or modules thereon, and wires electrically connecting said test field to some of said socket-type terminals so as to provide a means for testing the subscriber circuits.

2. An assembly according to claim 1 in which said test field comprises vertically offset sections each having a group of test terminals, each section being of a width that is less than the width of said front face.

3. A telephone distribution frame connector assembly comprising an insulating connecting block having a front face, a rear face and opposed side faces, means for mounting said block on a distribution frame such that said rear face is adjacent to said frame and said front face is remote from said frame, one of said side faces having groups of socket type electrical terminals for receiving a plurality of plug-in overload protector modules, said front face having terminals for wired connection to central office equipment, a cable stub adjacent to said rear face, means for securing said cable stub to said block, said cable stub having wires in electrical connection with said socket type terminals for completing subscriber circuits from the wires of the cable stub to said front face terminals, a test strip forming the front portion of said one side face, said front portion being offset from the adjacent part of the said one face that receives said modules, said test strip having a plurality of elongated receptacles each for test connection of a multiplicity of pairs of subscriber circuits.

4. A telephone distribution frame connector assembly comprising an insulating connecting block having a front face, a rear face and opposed side faces, means for mounting said block on a distribution frame such that said rear face is adjacent to said frame and said front face is remote from said frame, one of said side faces having groups of socket type electrical terminals for receiving a plurality of plug-in overload protector modules, said front face having an array of terminals for wired connection to central office equipment, a cable stub adjacent to said rear face, means for securing said cable stub to said block, said cable stub having wires for electrical connection with said socket type terminals for completing subscriber circuits from the wires of the cable stub to said front face terminals, a test field structure on said front face and accessible without interference from frame members of said frame or adjacent blocks or modules thereon, said test field structure comprising discrete test connector means, each test connector means being operable to test less than all of the subscriber circuits and being physically separate from another test connector means.

5. An assembly according to claim 4 wherein each test connector means is an elongated plug-in receptacle.

6. An assembly according to claim 4 wherein each test connector means is a test strip, the test strips being on opposite sides of said terminal array.

* * * * *